No. 718,826. PATENTED JAN. 20, 1903.
H. C. DICK & S. A. EHRENZELLER.
GAS METER.
APPLICATION FILED JAN. 30, 1900.
NO MODEL.
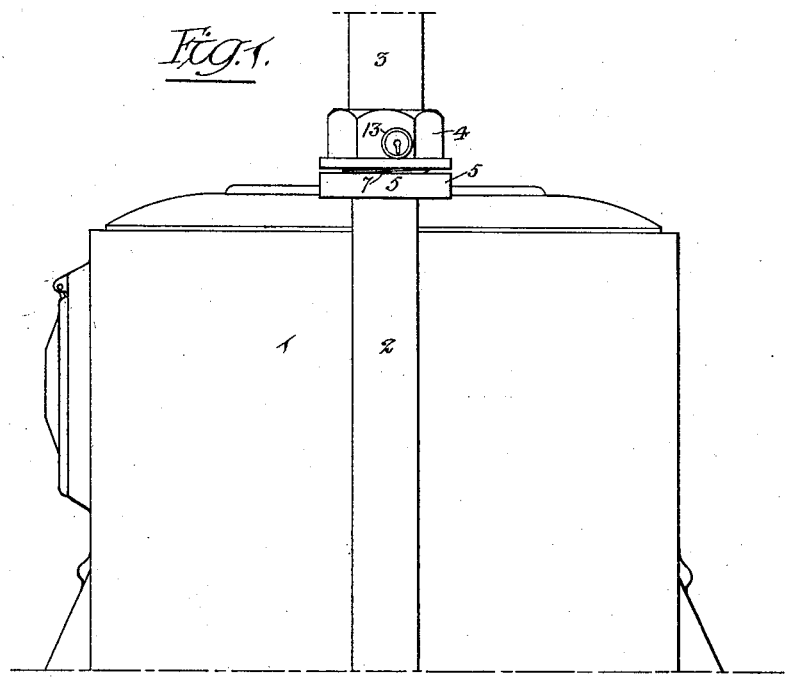
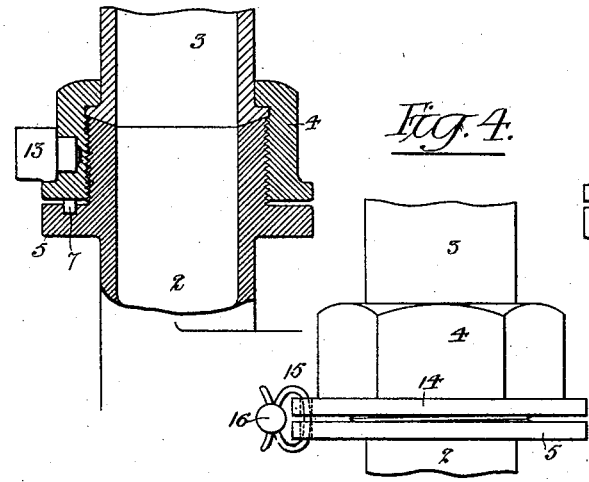
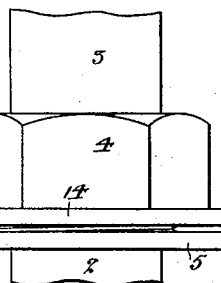
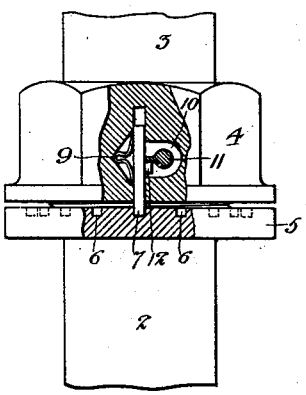
Witnesses:—
E. N. Lundahl.
Herman E. Metius.
Inventors:—
Harry C. Dick,
Samuel A. Ehrenzeller,
by their Attorneys;
Howson & Howson

UNITED STATES PATENT OFFICE.

HARRY C. DICK, OF PHILADELPHIA, PENNSYLVANIA, AND SAMUEL A. EHRENZELLER, OF WESTVILLE, NEW JERSEY.

GAS-METER.

SPECIFICATION forming part of Letters Patent No. 718,826, dated January 20, 1903.

Application filed January 30, 1900. Serial No. 3,311. (No model.)

*To all whom it may concern:*

Be it known that we, HARRY C. DICK, a resident of Philadelphia, Pennsylvania, and SAMUEL A. EHRENZELLER, a resident of Westville, Gloucester county, New Jersey, citizens of the United States, have invented certain Improvements in Gas-Meters, of which the following is a specification.

The object of our invention is to so construct a gas-meter as to prevent tampering with the same which would render inoperative for measuring purposes the mechanism whereby the flow of gas to and from the meter is normally controlled and would result in the passage of gas through the meter without proper actuation of the registering devices. This object we attain in the manner hereinafter set forth, reference being had to the accompanying drawings, in which—

Figure 1 is an end view of part of a gas-meter with our invention applied thereto. Fig. 2 is an enlarged sectional view showing the connection between the outlet-tube of the meter and the gas-delivery pipe and illustrating our invention. Fig. 3 is a side elevation of the same, partly in section; and Fig. 4 is a side view illustrating a modification of our invention.

Attempts have been made by dishonest users of gas to interfere with the proper operation of the registering devices of the meter and permit the gas to escape from said meter without properly registering its flow. One of the means employed is to form an opening between the delivery-tube of the meter and the gas-receiving chamber, so as to provide a direct flow of gas from one to the other without passing through the measuring-bellows or other measuring devices used, the service-pipe being detached from the delivery-tube and an opening made in the wall between said tube and the gas-receiving chamber. In order to prevent this, we lock the service-pipe to the delivery-tube in such manner that the disconnecting of the two cannot be effected by unauthorized persons or without showing that the connection has been tampered with.

In Fig. 1 of the drawings, 1 represents the casing of the meter; 2, the gas-delivery tube of the same; 3, the service-pipe, and 4 the coupling-nut whereby the said service-pipe is secured to the threaded upper end of said gas-delivery tube.

As shown in Figs. 2 and 3, the coupling-nut is locked to the delivery-tube by providing a collar 5 on said tube and forming in the upper face of said collar a series of notches or recesses 6, each of which is adapted for the reception of a locking-bolt 7, guided in a vertical opening in the coupling-nut 4 and acted upon by a spring 9, contained in a recess in said nut, so as to be frictionally retained in any position to which it has been adjusted. On the opposite side of the bolt-opening is a chamber 10 for the reception and operation of a key 11, which is inserted through a suitable keyhole in the side of the nut and is adapted to act upon a lug 12 at one side of the bolt 7, so that said bolt may be raised or lowered by the action of the key.

Before tightening the coupling-nut 4 the bolt 7 is raised, and the nut is then screwed down, so as to confine the pipe 3 and bring the bolt directly above one of the notches 6 in the collar 5 of the tube 2, the key 11 being then inserted and the bolt depressed so as to enter said notch, and thereby firmly lock the nut in position. The meter can therefore not be disconnected from the pipe 3, and access to the interior of the tube 2 is effectually prevented.

The nut 4 has a projecting cylinder 13, provided with tumblers for operation by the key, so as to render the picking of the lock as difficult as may be necessary.

If desired, the nut 4 may have a flange, as shown, for instance, at 14 in Fig. 4, this flange and the collar 5 of the tube 2 having openings, through any registering pair of which may be passed a wire 15, to be afterward secured by a seal 16. The coupling-nut on the gas-inlet tube of the meter may also be locked in position in the same manner as the nut 4.

Having thus described our invention, we claim and desire to secure by Letters Patent—

1. The combination of the gas or delivery tube forming part of the gas-meter and having a flange thereon, the external pipe communicating with said tube, the coupling-nut for connecting the pipe and tube, and means for securing said nut to the flange on the tube, said means including a lock controlling the release of the same, substantially as described.

2. The combination of the gas supply or delivery tube of a gas-meter having a recessed collar thereon, with a coupling-nut having a sliding bolt for engaging with said recess, and a lock on said nut, the sliding bolt being constructed to engage with the key of the lock, substantially as specified.

In testimony whereof we have signed our names to this specification in the presence of two subscribing witnesses.

HARRY C. DICK.
SAMUEL A. EHRENZELLER.

Witnesses:
F. E. BECHTOLD,
JOS. H. KLEIN.